(12) United States Patent
Parasuram et al.

(10) Patent No.: US 12,157,501 B2
(45) Date of Patent: Dec. 3, 2024

(54) PREDICTING AGENT TRAJECTORIES IN THE PRESENCE OF ACTIVE EMERGENCY VEHICLES

(71) Applicant: Waymo LLC, Mountain View, CA (US)

(72) Inventors: Aishwarya Parasuram, Sunnyvale, CA (US); Alisha Saxena, Bellevue, WA (US); Anoosha Sagar, Sunnyvale, CA (US); Kai Ding, Santa Clara, CA (US); Stéphane Ross, San Jose, CA (US); Xin Liu, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 267 days.

(21) Appl. No.: 17/514,766

(22) Filed: Oct. 29, 2021

(65) Prior Publication Data

US 2023/0139578 A1  May 4, 2023

(51) Int. Cl.
*B60W 60/00* (2020.01)
*B60W 40/04* (2006.01)
(Continued)

(52) U.S. Cl.
CPC ...... *B60W 60/00276* (2020.02); *B60W 40/04* (2013.01); *B60W 50/0097* (2013.01);
(Continued)

(58) Field of Classification Search
CPC ........... B60W 60/00276; B60W 40/04; B60W 50/0097; B60W 2420/42; B60W 2420/52;
(Continued)

(56) References Cited

U.S. PATENT DOCUMENTS 7,515,065 B1  4/2009  Bygrave et al.
8,676,427 B1  3/2014  Ferguson et al.
(Continued)

FOREIGN PATENT DOCUMENTS

DE  102011102024  4/2012
JP  2002245588  8/2002

OTHER PUBLICATIONS

Chai et al., "MultiPath: Multiple Probabilistic Anchor Trajectory Hypotheses for Behavior Prediction," CoRR, Oct. 2019, arxiv.org/abs/1910.05449, 14 pages.
(Continued)

*Primary Examiner* — Tiffany P Young
(74) *Attorney, Agent, or Firm* — Fish & Richardson P.C.

(57) ABSTRACT

Methods, systems, and apparatus, including computer programs encoded on a computer storage medium, that obtain scene features in an environment that includes an autonomous vehicle, a first target agent, and a second target agent, and determines whether the first target agent is an emergency vehicle that is active at a current time point. In response to determining that the first target agent is an emergency vehicle that is active at the current time point, an input is generated from the scene features. The input can characterize the scene and indicate that the first target agent is an emergency vehicle that is active at the current time point. Also in response, the input can be processed using a machine learning model that is configured to generate a trajectory prediction output for the second target agent that characterizes predicted future behavior of the second target agent after the current time point.

21 Claims, 5 Drawing Sheets

(51) Int. Cl.
*B60W 50/00* (2006.01)
*G06N 7/01* (2023.01)
*G06V 10/40* (2022.01)
*G06V 20/58* (2022.01)

(52) U.S. Cl.
CPC .............. *G06N 7/01* (2023.01); *G06V 10/40* (2022.01); *G06V 20/584* (2022.01); *B60W 2420/403* (2013.01); *B60W 2420/408* (2024.01)

(58) Field of Classification Search
CPC ....... B60W 2420/62; G06N 7/01; G06N 3/08; G06N 20/00; G06V 10/40; G06V 20/584; G06V 20/58
USPC .......................................................... 701/27
See application file for complete search history.

(56) References Cited

U.S. PATENT DOCUMENTS

| | | | |
|---|---|---|---|
| 8,700,251 B1 | 4/2014 | Zhu et al. | |
| 9,278,689 B1 | 3/2016 | Delp | |
| 9,821,807 B2 | 11/2017 | Herbach et al. | |
| 9,921,581 B2 | 3/2018 | Tseng et al. | |
| 10,059,334 B1 | 8/2018 | Zhu et al. | |
| 10,126,136 B2 | 11/2018 | Iagnemma | |
| 10,331,129 B2 | 6/2019 | Iagnemma et al. | |
| 10,332,396 B1 | 6/2019 | Christensen et al. | |
| 10,650,677 B2 | 5/2020 | Silver et al. | |
| 10,796,571 B2 | 8/2020 | Kim et al. | |
| 10,796,204 B2 | 10/2020 | Rohani et al. | |
| 10,825,341 B1 | 11/2020 | Grant | |
| 11,364,910 B1* | 6/2022 | Schmitt | G06F 18/2193 |
| 2008/0161987 A1 | 7/2008 | Breed | |
| 2015/0160653 A1* | 6/2015 | Cheatham, III | G05D 1/0088 701/23 |
| 2016/0252905 A1 | 9/2016 | Tian et al. | |
| 2017/0113689 A1 | 4/2017 | Gordon et al. | |
| 2018/0364732 A1 | 12/2018 | Yaldo et al. | |
| 2019/0039613 A1* | 2/2019 | Lee | G08G 1/167 |
| 2019/0155283 A1 | 5/2019 | Herbach et al. | |
| 2019/0329782 A1 | 10/2019 | Shalev-Shwartz et al. | |
| 2020/0023859 A1 | 1/2020 | Schmitt et al. | |
| 2021/0300412 A1* | 9/2021 | Dingli | B60W 50/0098 |
| 2022/0410937 A1* | 12/2022 | Parasuram | G05D 1/0214 |

OTHER PUBLICATIONS

Tolstaya et al., "Identifying Driver Interactions via Conditional Behavior Prediction," CoRR, Jun. 2021, arXiv:2104.09959, 7 pages.

* cited by examiner

PREDICTING AGENT TRAJECTORIES IN THE PRESENCE OF ACTIVE EMERGENCY VEHICLES

TECHNICAL FIELD

This specification relates to autonomous vehicles.

Autonomous vehicles include self-driving cars, motorcycles, trucks, buses and similar vehicles. Autonomous vehicles use a variety of on-board sensors and computer systems to detect nearby objects and use such detections to make control and navigation decisions.

SUMMARY

This specification describes a system implemented as computer programs on one or more computers in one or more locations that generates trajectory prediction data for agents in the vicinity of an autonomous vehicle, that is, within the sensing range of one or more sensors of the autonomous vehicle, when there is also an active emergency vehicle present in the vicinity.

One aspect features obtaining scene features in an environment that includes an autonomous vehicle, a first target agent, and a second target agent at a current time point, and determining whether the first target agent is an emergency vehicle that is active at the current time point. In response to determining that the first target agent is an emergency vehicle that is active at the current time point, an input is generated from the scene features. The input can characterize the scene and indicate that the first target agent is an emergency vehicle that is active at the current time point. Also in response, the input can be processed using a machine learning model that is configured to generate a trajectory prediction output for the second target agent that characterizes predicted future behavior of the second target agent after the current time point.

One or more of the following features can be included. The trajectory prediction output can contain multiple trajectory predictions, and each trajectory prediction can represent a likelihood that the second agent will perform a predicted travel behavior in a future time window after the current time point. At least one trajectory prediction can be added to the trajectory prediction output to form a second trajectory prediction output. For at least one prediction in the second trajectory prediction output, a modified likelihood that the second agent will follow the trajectory associated with at least one prediction in the second trajectory prediction output in a future time window after the current time point can be determined. At least one added trajectory prediction can specify a trajectory for which the likelihood that the trajectory is followed by agents is greater by at least a configured threshold when an active emergency vehicle is in the vicinity than when an active emergency vehicle is not in the vicinity. At least one added trajectory prediction can relate to the second agent pulling over. Determining that the first target agent is an emergency vehicle that is active at the current time point can include the autonomous vehicle obtaining at least one sensor reading and determining that the at least one sensor reading indicates that the first agent is an active emergency vehicle.

Particular embodiments of the subject matter described in this specification can be implemented so as to realize one or more of the following advantages. When an autonomous vehicle and another agent are both in the vicinity of an active emergency vehicle, the techniques described below can be used to predict the trajectory of the agent, which can allow the autonomous vehicle to navigate safely despite the atypical behaviors that can be exhibited by agents that are in the vicinity of an active emergency vehicle. Behaviors can be atypical since agents are often required by law to behave differently when active emergency vehicles are present, for example, but slowing and pulling over. Therefore, existing trajectory predictions for such agents can fail to predict accurately, which can lead to suboptimal operation by autonomous vehicles. In addition, the techniques described below can differentiate between active emergency vehicles and inactive emergency vehicles. Since active emergency vehicles induce atypical behaviors by agents in the vicinity, but inactive emergency vehicles do not induce those same behaviors, it is advantageous to the proper operation of an autonomous vehicle to differentiate active emergency vehicles from inactive emergency vehicles when making behavior predictions for agents that are in the vicinity of the emergency vehicle. Further, the techniques described below enable an autonomous vehicle to safely plan and execute a pullover that avoids other agents that are predicted to slow down or pullover in the presence of an active emergency vehicle.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an on-board system of an autonomous vehicle can generate trajectory predictions for agents in the vicinity of the autonomous vehicle when an active emergency vehicle (EV) is also in the vicinity of the autonomous vehicle. The on-board system uses the trajectory predictions to guide the behavior of the autonomous vehicle.

Understanding the trajectory of agents when an active emergency vehicle is in the vicinity of an autonomous vehicle promotes the safe operation of the autonomous vehicle. Vehicles in the vicinity of an active emergency vehicle are often required by law to perform certain driving actions that permit the active emergency vehicle to travel swiftly and safely to a destination. Such actions can include slowing, stopping and pulling over to the side of the road.

However, these trajectories can be atypical for agents, i.e., are typically observed only when an active emergency vehicle is present, making them more difficult to anticipate. In addition, these trajectories are typically only observed when there is an active emergency vehicle in the vicinity, and not when an inactive emergency vehicle is in the vicinity. Therefore, predicting such agent trajectories requires enhancements to existing trajectory prediction approaches, including identifying the presence of an active emergency vehicle.

In particular, the on-board system can generate a trajectory prediction for a given agent by obtaining scene features, determining that a different agent in the scene is an emergency vehicle that is active at the current time point, and using the scene features as input to one or more machine learning models that each generate a prediction that characterizes the predicted trajectory of the given agent.

The on-board system can use the predicted trajectory to perform actions, i.e., to control the vehicle, which causes the vehicle to operate more safely. For example, the on-board system can generate fully-autonomous control outputs to apply the brakes of the vehicle to avoid an interaction with an agent that is expected to pull over at a location that would be atypical when an active emergency vehicle is not present.

These features and other features are described in more detail below.

Figure 1A:
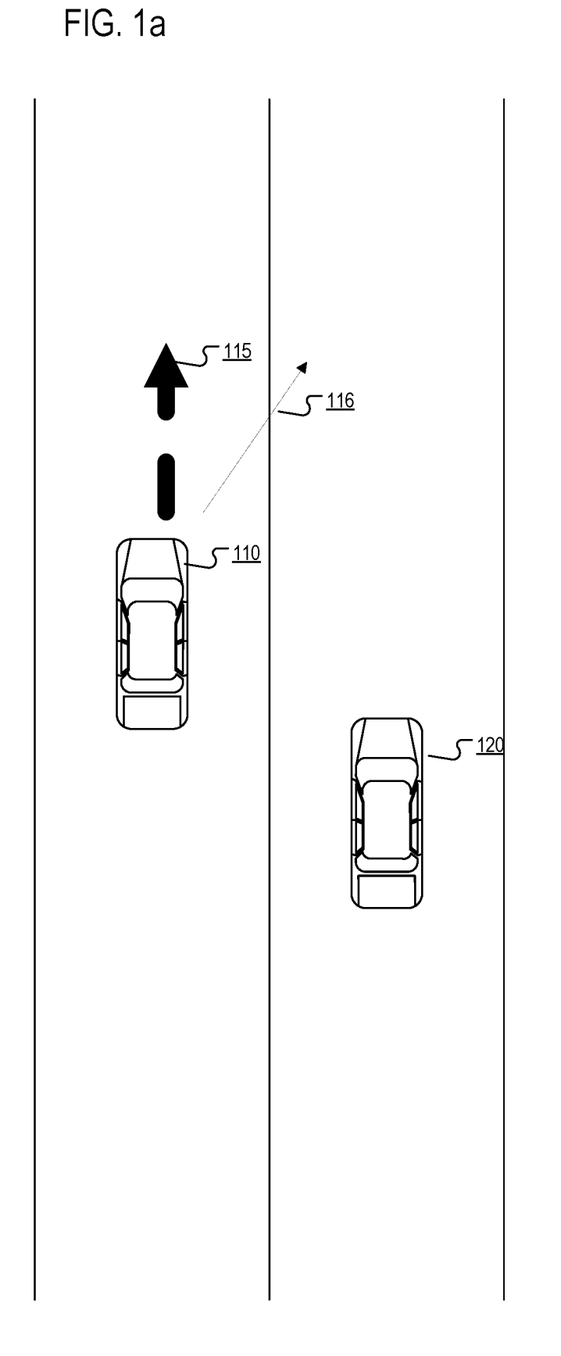
FIGS. 1a and 1b are diagrams of vehicles traveling on a roadway.
Figure 1B:
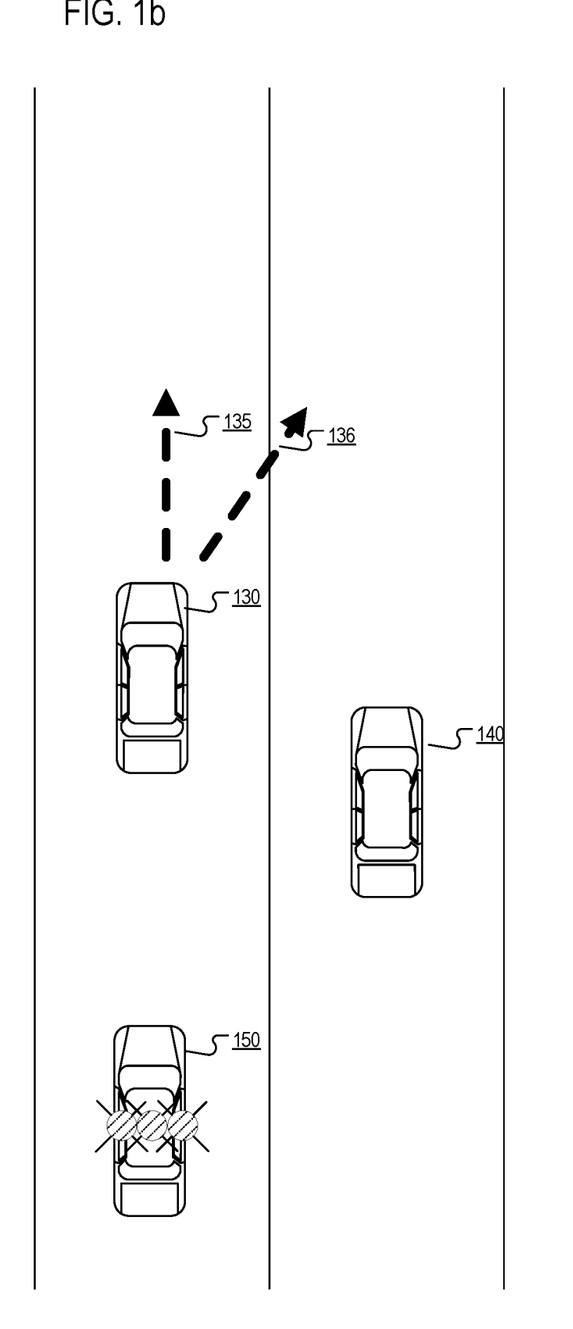

FIGS. 1a and 1b are diagrams of vehicles traveling on a roadway. In FIG. 1a, and autonomous vehicle 120 is traveling in the right lane with another agent 110 traveling in front of and in a different lane from the autonomous vehicle 120. In this case, the agent 110 is predicted to follow a forward trajectory 115 with a high probability, as illustrated by the thick line. In a second trajectory 116, the agent 110 merges into the lane occupied by the autonomous vehicle 120, but this is predicted with very low probability, as illustrated by the thin line. Under normal driving conditions, it would be atypical—that is, predicted with low probability—for an agent 130 to cut in front of another vehicle, including an autonomous vehicle 120. In fact, in some cases, the second trajectory 116 would not be present in the set of trajectory predictions as its likelihood is extremely low.

In FIG. 1b, an autonomous vehicle 140 is again traveling in the right lane with another agent 130 traveling in front of and in a different lane from the autonomous vehicle 120. In addition, an active emergency vehicle 150 is approaching the agent 130 from behind. In this case, the agent 130 might follow a trajectory 136 that allows the active emergency vehicle 150 to pass, an action often required by law, but which could interfere with the travel of the autonomous vehicle 140. This second trajectory 136 can be predicted with approximately equal weight with the forward trajectory 135, as illustrated by the lines of equal weight. Predicting the possibility that the agent 130 might follow the trajectory 136 that involves pulling into the travel lane occupied by the autonomous vehicle 140 can be advantageous as it can permit the control system on the autonomous vehicle 140 to adjust the behavior of the autonomous vehicle 140, for example, by slowing the speed to allow room for the other agent 130 to merge into the lane.

Figure 2:
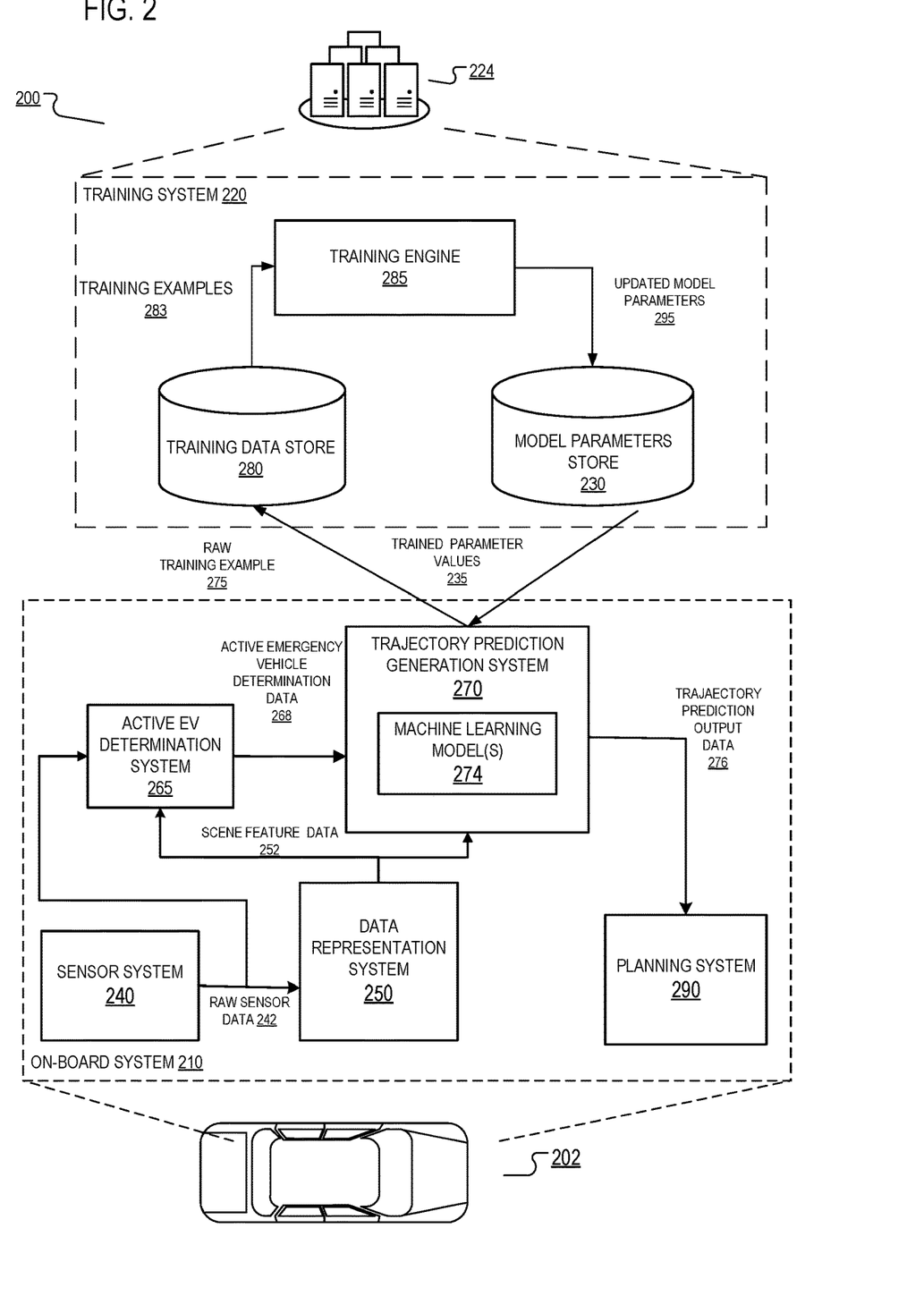
FIG. 2 is a diagram of an example system for predicting agent trajectories in the vicinity of an active emergency vehicle.

FIG. 2 is a diagram of an example system 200 for predicting agent trajectories in the vicinity of an active emergency vehicle. The system 200 can include an on-board system 210 and a training system 220.

The on-board system 210 is located on-board a vehicle 202 and is responsible for safely navigating the vehicle in the environment. Accordingly, it includes components used to detect and understand the environment, then to plan a safe path. The on-board system 210 is composed of hardware and software components, some or all of which are physically located on-board a vehicle 202. The components of the on-board system 210 are described in more detail below.

In some cases, the on-board system 210 can make fully-autonomous or partly-autonomous driving decisions (i.e., driving decisions taken independently of the driver of the vehicle 202), present information to the driver of a vehicle 202 to assist the driver in operating the vehicle safely, or both. For example, in response to determining that another agent might interact with the vehicle 202, the on-board system 210 may autonomously apply the brakes of the vehicle 202 or otherwise autonomously change the trajectory of the vehicle 202 to prevent an unwanted interaction between the vehicle 202 and the agent.

Although the vehicle 202 in FIG. 2 is depicted as an automobile, and the examples in this document are described with reference to automobiles, in general the vehicle 202 can be any kind of vehicle. For example, besides an automobile, the vehicle 202 can be another kind of autonomous vehicle that travels along a roadway, e.g., a truck or a motorcycle. Moreover, the on-board system 210 can include components additional to those depicted in FIG. 2 (e.g., a collision detection system or a navigation system).

To enable the safe control of the autonomous vehicle 202, the on-board system 210 includes a sensor system 240 which enables the on-board system 210 to "see" the environment in the vicinity of the vehicle 202. More specifically, the sensor system 240 includes one or more sensors, some of which are configured to receive reflections of electromagnetic radiation from the environment in the vicinity of the vehicle 202. For example, the sensor system 240 can include one or more laser sensors (e.g., LIDAR laser sensors) that are configured to detect reflections of laser light. As another example, the sensor system 240 can include one or more radar sensors that are configured to detect reflections of radio waves. As another example, the sensor system 240 can include one or more camera sensors that are configured to detect reflections of visible light.

The sensor system 240 continually (i.e., at each of multiple time points) captures raw sensor data which can indicate the directions, intensities, and distances travelled by reflected radiation. For example, a sensor in the sensor system 240 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight. The sensor subsystems 240 can also include a combination of components that receive reflections of electromagnetic radiation, e.g., lidar systems that detect reflections of laser light, radar systems that detect reflections of radio waves, and camera systems that detect reflections of visible light.

The sensor subsystems 240 or other components of the vehicle 202 can also classify groups of one or more raw sensor measurements from one or more sensors as being measures of another agent in the environment. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 240 classify one or more groups of raw sensor measurements as being measures of respective other agents, the sensor subsystems 240 can compile the raw sensor measurements into a set of raw data 242, and send the raw data 242 to a data representation system 250.

The data representation system 250, also on-board the vehicle 202, receives the raw sensor data 242 from the sensor system 240 and additional data that characterizes the environment, i.e., roadgraph data that identifies lanes, road edges, medians and marked crossing zones within roadways in the environment and generates scene feature data 252 that includes features that characterize the agents and environment in the vicinity of the vehicle 202.

The scene feature data 252 can include a broad range of data for each agent in the scene such as the type of agent (motor vehicle, pedestrian, cyclist, etc.); whether the agent is an emergency vehicle; the agent's location (e.g., (x,y) coordinates); velocity; acceleration; the distance between the emergency vehicle and the agent; the standard deviation of velocity; trajectory; whether the predicted trajectories, computed during the immediate prior time point, for the agent and for the emergency vehicle overlap; and so on. The scene feature data 252 can further include data derived from the roadgraph data such as distance to road edge, medians, type of lane, marked and unmarked crosswalks, etc. The scene feature data 252 can also include traffic information, e.g., state of other agents in the vicinity, traffic light status, etc. The scene feature data 252 can include these data both for a most recent sampling and for prior samplings, i.e., from a most recent time point and one or more earlier time points that are within a recent time window of the most recent time point.

The on-board system can augment the data available from the sensor system 240 by accessing data available in data repositories stored within the autonomous vehicle 202, or data repositories outside of, but coupled to, the autonomous vehicle, such as in a data center with the data available made to the autonomous vehicle over a cellular or other wireless network.

The data representation system 250 can provide the scene feature data 252 to an active emergency vehicle determination system 265 on-board the vehicle 202.

The active emergency vehicle determination system 265 can use the scene feature data 252 and raw sensor data 242 to determine whether an agent present in the scene feature data 252 is an active emergency vehicle.

The active emergency vehicle determination system 265 can pass to a trajectory prediction generation system 270 active emergency vehicle determination data 268 indicating that a particular agent in the scene feature data 262 is an active emergency vehicle.

The trajectory prediction generation system 270 can process input derived from the features and active emergency vehicle determination data 268 using each of one or more machine learning models. Each machine learning model can generate trajectory prediction output data 276 for a target agent (other than the active emergency vehicle) in the vicinity of the autonomous vehicle 202. The trajectory prediction output data 276 can include one or more trajectory predictions. The trajectory prediction output data 276 can also include, for each trajectory prediction, a score that indicates the predicted likelihood that the agent will follow the trajectory. A trajectory prediction specifies a future trajectory for the agent, for example, as a prediction that defines a probability distribution over a space of possible future paths for the agent.

The machine learning model 274 can be any appropriate type of machine learning model, such as a recurrent neural network, that can map a set of features to a trajectory prediction. Examples of features used by one or more machine learning models can include (a) raw sensor data 242, (b) scene feature data 252, and (c) external data, such as a roadgraph, all described above. External data can further include explicit signals relevant to trajectory predictions. For example, in some implementations, the system can obtain one or more signals that indicate the locations of emergency vehicles that are, or will become, active when in the vicinity of an autonomous vehicle. For example, the system can obtain emergency transmission data exchanged between an emergency vehicle and a dispatcher.

The trajectory prediction output data 276 can be delivered to a planning system. The planning system 290 can use the trajectory prediction output data 276 to make fully-autonomous driving decisions, i.e., to update a planned trajectory for the vehicle 202. For example, the planning system 290 can generate a fully-autonomous plan to navigate the vehicle 202 to permit safe travel of the active emergency vehicle while also avoiding unwanted interactions with other agents in the environment, including the agent to which the trajectory predictions are relevant. In a particular example, the on-board system 210 may provide the planning system 290 with data indicating that an agent is predicted to pull over in way that could cause interaction with the vehicle 202. In this example, the planning system 290 can generate fully-autonomous control outputs to apply the brakes of the vehicle 202 to avoid the agent that is projected to pull over.

The fully-autonomous driving decisions generated by the planning system 290 can be implemented by a control system of the vehicle 202. For example, in response to receiving a fully-autonomous driving decision generated by the planning system 290 which indicates that the brakes of the vehicle should be applied, the control system may transmit an electronic signal to a braking control unit of the vehicle. In response to receiving the electronic signal, the braking control unit can mechanically apply the brakes of the vehicle.

The training system 220, which is associated with the on-board system 210, is responsible for creating trained parameter values 235 used by the on-board system 202 in one or more machine learning models 274.

The training system 220 includes a training data store 280 that stores the training data used to train the parameter values of each of the machine learning model 274. The training data store 280 receives raw training examples from vehicles operating in the real world. For example the training data store 280 can receive a raw training example 275 from the vehicle 202 and one or more other agents that are in communication with the training system 220. Each raw training example 275 can be processed by the training system 220 to generate a new training example used to train one or more machine learning models 274.

The raw training examples 275 can include a model input for at least one machine learning model 274. The raw training examples 275 can also include outcome data characterizing the trajectory of an agent in the vicinity of an active emergency vehicle. This outcome data can be used to generate a training example for one or more of the machine learning models 274. For example, for a recurrent neural network that is configured to generate trajectories for an agent in the vicinity of an active emergency vehicle, training examples can include data representing trajectories of agents in the vicinity of an active emergency vehicle.

The training data store 280 provides training examples 283 to a training engine 285, also housed in the training system 220. The training engine 285 uses the training examples 283 to update the model parameters of the machine learning model 274, and provides the updated model parameters 295 to the model parameters store 230. Once the parameter values of the model 274 have been fully trained, the training system 220 can send the trained parameter values 235 to the on-board system 210, e.g., through a wired or wireless connection.

The training system 220 is typically hosted within a data center 224, which can be a distributed computing system having hundreds or thousands of computers in one or more locations.

Figure 3:
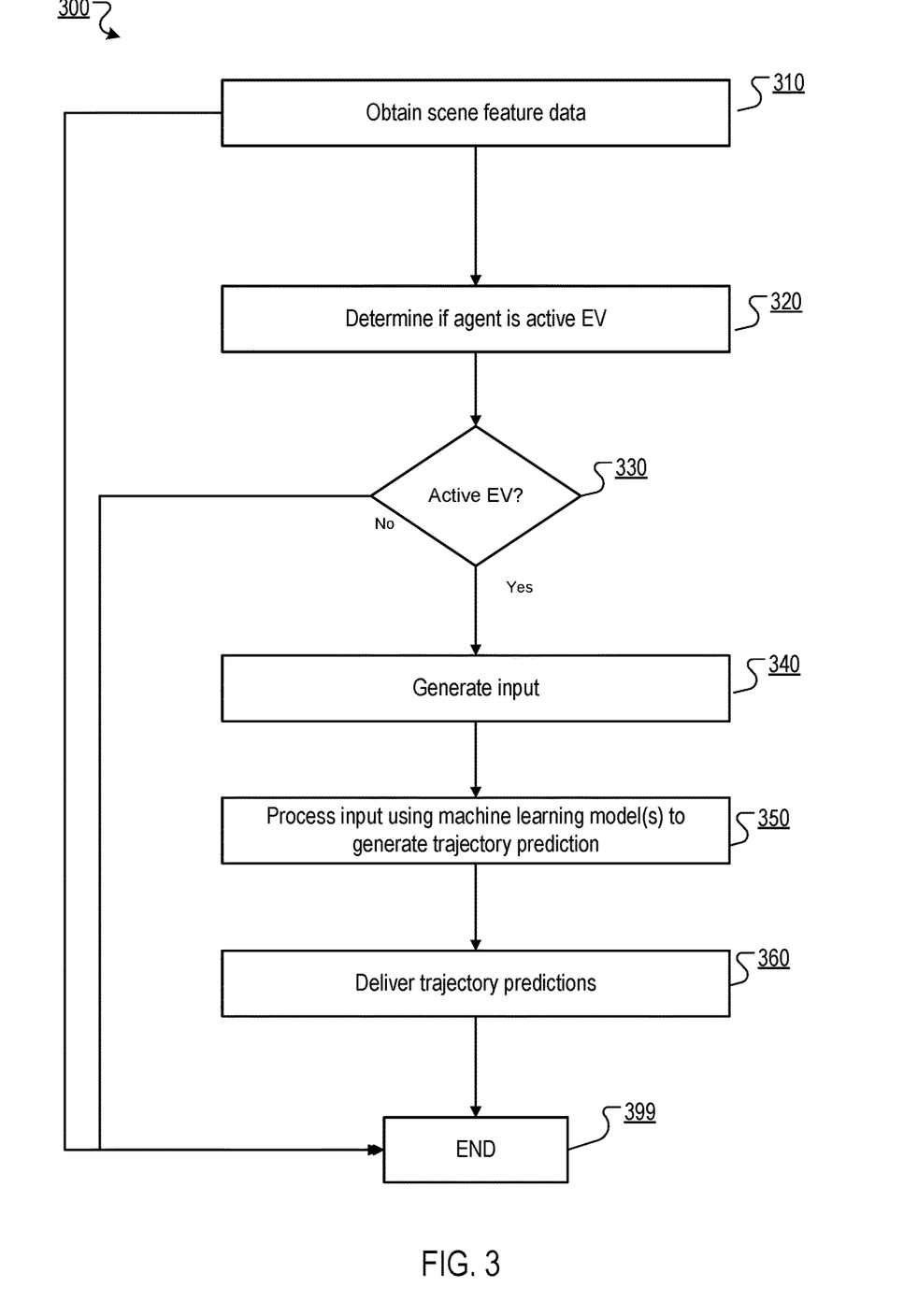
FIGS. 3 and 4 are flow diagrams of an example process for predicting agent trajectories in the vicinity of an active emergency vehicle.

FIG. 3 is a flow diagram of an example process 300 for predicting agent trajectories in the vicinity of an active emergency vehicle. For convenience, the process 300 will be described as being performed by a system for predicting agent trajectories in the vicinity of an active emergency vehicle, e.g., the system 200 of FIG. 2, appropriately programmed to perform the process.

In operation 310, the system obtains scene feature data. As described above, scene feature data can be obtained from sensors on the autonomous vehicle, other sensors in the environment and from one or more external data stores.

In operation 320, the system determines whether at least one agent in the scene is an active emergency vehicle in the vicinity of the agent. The system can determine that an agent is an active emergency vehicle using a variety of indications, including explicit signals, external signals, combinations of those indications or other techniques. Note that it is not sufficient to determine that an agent is an emergency vehicle since inactive emergency vehicles do not typically cause other agents in the scene to diverge from typical operation.

In some implementations, the system can use explicit signals emitted by an agent to determine that the agent is an active emergency vehicle. Explicit signals can include visual indicators, such as flashing lights, and/or audible indicators, such as sirens. In one example, the system can compare audio data sensed by microphones on the autonomous vehicle to an audio data profile associated with an active emergency vehicle. If the sensed audio data matches the profile, the system can determine that the emergency vehicle has an active siren and is therefore an active emergency vehicle. In another example, the system can use the cameras on an autonomous vehicle to detect flashing lights. As one example, the system can determine that the emergency vehicle is active when the emergency vehicle has flashing lights. As another example, the system can determine that the emergency vehicle is active when the emergency vehicle has an active siren. As yet another example, the system can determine that the emergency vehicle is active only when the emergency vehicle has both an active siren and flashing lights.

In some implementations, the determination that a target agent is an active emergency vehicle is made by a system outside the system described in this specification, and such a determination can be obtained by the system of this specification, for example, by receiving a network communication indicating that an active emergency vehicle is present.

In decision operation 330, the system proceeds to operation 340 if the scene contains at least one active emergency vehicle; the system proceeds to operation 399 if the scene does not contain an active emergency vehicle.

In operation 340, the system generates an input for predicting the behavior for a second agent in the scene that is not the active emergency vehicle. The input (i) characterizes the scene and (ii) indicates that the first target agent is an emergency vehicle that is active at the current time point (as described in reference to operation 320). The feature indicating whether the first target agent is an active emergency vehicle can be a binary feature where 'true' indicates that the first target agent is an active emergency vehicle and 'false' indicates that the first target agent is not an active emergency vehicle. The system can generate input from the scene features using an encoder neural network, or by using other conventional machine learning techniques. When the first target agent is not an active emergency vehicle, per the binary feature, the system can remove features relevant to an active emergency vehicle from the input, or set the values for the features to placeholder values that indicate that no active EV is within the vicinity of the agent. Such features can include the distance between the emergency vehicle and the agent; whether the predicted trajectories for the agent and for the emergency vehicle overlap; etc.

In operation 350, the system processes the input using a machine learning model to generate a trajectory prediction for the second agent (that is, not the active emergency vehicle) in the scene. A trajectory prediction output produced by the machine learning model can include one or more predicted trajectories for the second agent and one or more scores associated with each predicted trajectory. Each score can indicate a predicted likelihood that the second agent will follow the associated predicted trajectory.

The machine learning model can be a deep learning model, such as a recurrent neural network or a convolutional neural network, a random forest, an inverse reinforcement learning model or a cost function optimization model.

In some implementations, a trajectory prediction output produced by the machine learning model can include a probability distribution over a space of possible trajectories. Examples of models that generate probability distributions include the models described in *Identifying Driver Interactions via Conditional Behavior Prediction*, available at arXiv:2104.09959 and *MultiPath: Multiple Probabilistic Anchor Trajectory Hypotheses for Behavior Prediction*, available at arXiv:2104.05449.

In operation 360, the system delivers the trajectory predictions. In some implementations, the system delivers the trajectory predictions to a planning system on the autonomous vehicle that is responsible for operating the vehicle, as described above.

In operation 399, the system ceases this processing iteration.

Figure 4:
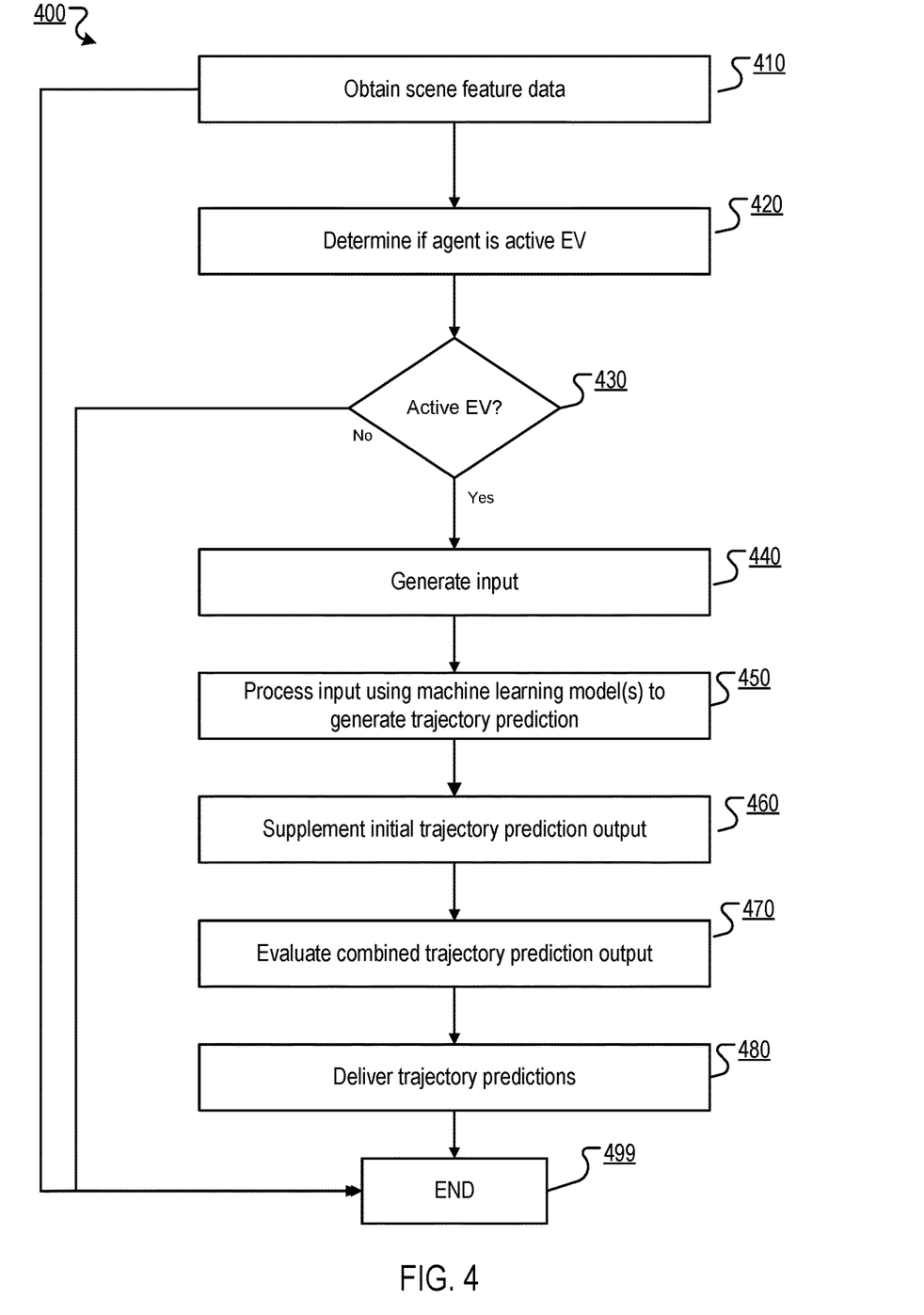

FIG. 4 is a flow diagram of an example process 400 for predicting agent trajectories in the vicinity of an active emergency vehicle. For convenience, the process 400 will be described as being performed by a system for predicting agent trajectories in the vicinity of an active emergency vehicle, e.g., the system 200 of FIG. 2, appropriately programmed to perform the process. As described further below, process 400 differs from process 300 in that process 400 supplements an initial trajectory prediction output by adding specific trajectories that are unlikely to be followed by agents that are not in the vicinity of active emergency vehicles and that are more likely to be followed when in the vicinity of an active emergency vehicle.

In operation 410, the system obtains scene feature data. As described above, scene feature data can be obtained from sensors on the autonomous vehicle, other sensors in the environment and from one or more external data stores.

In operation 420, the system determines whether at least one agent in the scene is an active emergency vehicle in the vicinity of the agent, e.g., as described above with reference to operation 320 of FIG. 3.

In decision operation 430, the system proceeds to operation 440 if the scene contains at least one active emergency vehicle; the system proceeds to operation 499 if the scene does not contain an active emergency vehicle.

In operation 440, the system generates an input that includes the scene features. The system can encode the scene features using an encoder neural network.

In operation 450, the system processes the input to generate an initial trajectory prediction for a second agent (that is, not the active emergency vehicle) in the scene. An initial trajectory prediction output produced by the machine learning model can include one or more predicted trajectories for the second agent and one or more scores associated with each predicted trajectory. Each score can indicate a predicted likelihood that the second agent will follow the associated predicted trajectory. In some implementations, the output can be a probability distribution over the space of possible trajectories, for example, as described in *Identifying Driver Interactions via Conditional Behavior Prediction* and *MultiPath: Multiple Probabilistic Anchor Trajectory Hypotheses for Behavior Prediction* (cited above).

In operation 460, the system modifies the initial trajectory prediction output that is generated by the machine learning model (e.g., as described above). The system can modify the initial behavior prediction output by adding additional trajectories and by adjusting the scores associated with some trajectories.

In some implementations, the system can supplement an initial trajectory prediction output that is generated by a machine learning model (e.g., as described above) by adding specific trajectories that are unlikely (that is, the predicted likelihood of following such a trajectory is below a threshold value) to be followed by agents that are not in the vicinity of active emergency vehicles and that are more likely (that is, the predicted likelihood of following such a trajectory is above a threshold value) to be followed when in the vicinity of an active emergency vehicles. The system can add such trajectories, for example, by causing the probability distribution generated by the machine learning model to be "anchored" at trajectories providing the anchors as input to the model. For example, the probability distribution can be a Gaussian Mixture Model (GMM) that has one or more conventional anchor trajectories and additional anchors generated for the list of categories, In some implementations, the system maintains a list of categories of such trajectories. Examples of such trajectory categories can include pulling over outside a parking zone, pulling over in an intersection, rapidly slowing down, and so on. For one or more of the trajectory categories, the system can generate one or more trajectory predictions associated with the category, accounting for the current state of the agent (e.g., its speed, location, heading) and using conventional motion planning techniques. Once the additional trajectory predictions are created, the system can add the trajectory predictions to the trajectory prediction output to form combined trajectory prediction output as described above.

In operation 470, the system evaluates the combined trajectory prediction output. In some implementations, the system can include a predefined score for each such added trajectory, add each trajectory and associated score into the trajectory prediction output, then normalize the combined scores (that is, scores from the trajectory in the initial trajectory prediction output and scores for the added trajectory) to produce modified trajectory predictions.

In some implementations, the system can use a trajectory evaluation machine learning model to determine, for each of one or more of the trajectory in the initial trajectory prediction output and in the added trajectories, a score that represents a likelihood that an agent will follow the trajectory when it is in vicinity of an active emergency vehicle. The trajectory evaluation machine learning model can be a classification model the processes input that can include the modified set of trajectories to assign likelihoods to each trajectory. This classification model can be a deep neural network, a random forest or other binary classification machine learning model. The model can be configured to produce as output a value between 0 and 1 that represents the probability of occurrence of each trajectory. The trajectory evaluation machine learning model can be configured to predict the trajectory of agents in the vicinity of an active emergency vehicle by training on datasets in which active emergency vehicles are overrepresented (as compared to the dataset in which the presence of emergency vehicles reflects their presence in a representative random sample), or by modifying the weights of certain training examples or model losses to overweight samples in which active emergency vehicles are present.

In some implementations, the system can adjust the scores, increasing by configured amounts the scores of trajectories that are more likely to be followed by an agent that is in the vicinity of an active emergency vehicle than by an agent that is not in the vicinity of an active emergency vehicle. The system can then store the score associated with each trajectory prediction in the combined trajectory prediction output.

In some implementations, when the output of the model is a probability distribution over the space of possible trajectories, the system can adjust the probability distributions for trajectories more likely to be followed by an agent in the vicinity of an active emergency vehicle than by agents that are not in the vicinity of an active emergency vehicle by increasing the probabilities associated with those trajectories.

In operation 480, the system delivers the trajectory predictions. In some implementations, the system delivers the trajectory predictions to a planning system on the autonomous vehicle that is responsible for operating the vehicle, as described above.

In operation 499, the system ceases this processing iteration.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Embodiment 1 is a method comprising:
obtaining scene features of a scene in an environment that includes an autonomous vehicle, a first target agent, and a second target agent at a current time point;
determining whether the first target agent is an emergency vehicle that is active at the current time point; and
in response to determining that the first target agent is an emergency vehicle that is active at the current time point:
generating from the scene features, an input that (i) characterizes the scene and (ii) indicates that the first target agent is an emergency vehicle that is active at the current time point; and
processing the input using a machine learning model that is configured to generate a trajectory prediction output for the second target agent that characterizes predicted future behavior of the second target agent after the current time point.

Embodiment 2 is the method of embodiment 1 where:
the trajectory prediction output contains a plurality of trajectory predictions; and
each trajectory prediction represents a likelihood that the second agent will perform a predicted travel behavior in a future time window after the current time point.

Embodiment 3 is the method of embodiment 2 further comprising: adding at least one trajectory prediction to the trajectory prediction output to form a second trajectory prediction output.

Embodiment 4 is the method of embodiment 3 further comprising: determining, for at least one prediction in the second trajectory prediction output, a modified likelihood that the second agent will follow the trajectory associated with the at least one prediction in the second trajectory prediction output in a future time window after the current time point.

Embodiment 5 is the method of embodiment 4 where at least one added trajectory prediction specifies a trajectory for which: the likelihood that the trajectory is followed by agents is greater by at least a configured threshold when an active emergency vehicle is in the vicinity than when an active emergency vehicle is not in the vicinity.

Embodiment 6 is the method of any of embodiments 4-5 where at least one added trajectory prediction relates to the second agent pulling over.

Embodiment 7 is the method of any of embodiments 1-6 where determining that the first target agent is an emergency vehicle that is active at the current time point comprises:
obtaining, by the autonomous vehicle, at least one sensor reading; and
determining that the at least one sensor reading indicates that the first agent is an active emergency vehicle.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
obtaining scene features of a scene in an environment that includes an autonomous vehicle, a first target agent, and a second target agent at a current time point, wherein the second target agent is different from the first target agent;
determining that the first target agent is an emergency vehicle that is active at the current time point;
generating from the scene features, an input that characterizes the scene;
processing the input that characterizes the scene using a machine learning model that is configured to generate an initial trajectory prediction output for the second target agent that comprises a plurality of predicted trajectories for the second target agent;
based on determining that the first target agent is an emergency vehicle, generating a modified trajectory prediction output, comprising adding, to the initial trajectory prediction output, one or more additional trajectories for the second target agent; and
controlling the autonomous vehicle according to the generated trajectory prediction output for the second target agent.

2. The method of claim 1 where:
the initial trajectory prediction output comprises a respective trajectory prediction score for each of the plurality of predicted trajectories; and each trajectory prediction score represents a likelihood that the second agent will perform the corresponding predicted trajectory in a future time window after the current time point.

3. The method of claim 2, wherein generating the modified trajectory prediction output further comprises:
determining, for at least one predicted trajectory in the initial trajectory prediction output, a modified trajectory prediction score.

4. The method of claim 2, wherein generating the modified trajectory prediction output comprises adding, to the initial trajectory prediction output, a respective trajectory prediction score for each of the additional trajectories.

5. The method of claim 2, wherein determining, for at least one predicted trajectory in the initial trajectory prediction output, a modified trajectory prediction score comprises reducing the respective trajectory prediction score for the predicted trajectory.

6. The method of claim 1, where, for one or more of the additional trajectories:
the likelihood that the additional trajectory is followed by agents is greater by at least a configured threshold when an active emergency vehicle is in the vicinity than when an active emergency vehicle is not in the vicinity.

7. The method of claim 1 where at least one of the additional trajectories relates to the second agent pulling over.

8. The method of claim 1 where determining that the first target agent is an emergency vehicle that is active at the current time point comprises:
obtaining, by the autonomous vehicle, at least one sensor reading; and
determining that the at least one sensor reading indicates that the first agent is an active emergency vehicle.

9. The method of claim 1 wherein the input comprises a binary feature, wherein a first value of the binary feature indicates that the first target agent is an active emergency vehicle, a second value of the binary feature indicates that the first target agent is not an active emergency vehicle, and the first value differs from the second value.

10. The method of claim 9, further comprising in response to determining that the binary feature indicates that the first target agent is an active emergency vehicle, including, in the input, features relevant to an active emergency vehicle.

11. A system comprising one or more computers and one or more storage devices storing instructions that when executed by the one or more computers cause the one or more computers to perform operations comprising:
obtaining scene features of a scene in an environment that includes an autonomous vehicle, a first target agent, and a second target agent at a current time point, wherein the second target agent is different from the first target agent;
determining that the first target agent is an emergency vehicle that is active at the current time point;
generating from the scene features, an input that characterizes the scene;
processing the input that characterizes the scene using a machine learning model that is configured to generate an initial trajectory prediction output for the second target agent that comprises a plurality of predicted trajectories for the second target agent;
based on determining that the first target agent is an emergency vehicle, generating a modified trajectory prediction output, comprising adding, to the initial trajectory prediction output, one or more additional trajectories for the second target agent; and
controlling the autonomous vehicle according to the generated trajectory prediction output for the second target agent.

12. The system of claim 11 where:
the initial trajectory prediction output comprises a respective trajectory prediction score for each of the plurality of predicted trajectories; and
each trajectory prediction score represents a likelihood that the second agent will perform the corresponding predicted trajectory in a future time window after the current time point.

13. The system of claim 11, wherein generating the modified trajectory prediction output further comprises:
determining, for at least one predicted trajectory in the initial trajectory prediction output, a modified trajectory prediction score.

14. The system of claim 13 where at least one of the additional trajectories relates to the second agent pulling over.

15. The system of claim 11, where, for one or more of the additional trajectories:
the likelihood that the additional trajectory is followed by agents is greater by at least a configured threshold when an active emergency vehicle is in the vicinity than when an active emergency vehicle is not in the vicinity.

16. The system of claim 11 where determining that the first target agent is an emergency vehicle that is active at the current time point comprises:
obtaining, by the autonomous vehicle, at least one sensor reading; and
determining that the at least one sensor reading indicates that the first agent is an active emergency vehicle.

17. One or more non-transitory computer-readable storage media storing instructions that when executed by one or more computers cause the one or more computers to perform operations comprising:
obtaining scene features of a scene in an environment that includes an autonomous vehicle, a first target agent, and a second target agent at a current time point, wherein the second target agent is different from the first target agent;
determining that the first target agent is an emergency vehicle that is active at the current time point;
generating from the scene features, an input that characterizes the scene;
processing the input that characterizes the scene using a machine learning model that is configured to generate an initial trajectory prediction output for the second target agent that comprises a plurality of predicted trajectories for the second target agent;
based on determining that the first target agent is an emergency vehicle, generating a modified trajectory prediction output, comprising adding, to the initial trajectory prediction output, one or more additional trajectories for the second target agent; and
controlling the autonomous vehicle according to the generated trajectory prediction output for the second target agent.

18. The one or more non-transitory computer-readable storage media of claim 17 where:
the initial trajectory prediction output comprises a respective trajectory prediction score for each of the plurality of predicted trajectories; and
each trajectory prediction score represents a likelihood that the second agent will perform the corresponding predicted trajectory in a future time window after the current time point.

19. The one or more non-transitory computer-readable storage media of claim 16, wherein generating the modified trajectory prediction output further comprises:
- determining, for at least one predicted trajectory in the initial trajectory prediction output, a modified trajectory prediction score.

20. The one or more non-transitory computer-readable storage media of claim 16 where, for one or more of the additional trajectories:
- the likelihood that the additional trajectory is followed by agents is greater by at least a configured threshold when an active emergency vehicle is in the vicinity than when an active emergency vehicle is not in the vicinity.

21. The one or more non-transitory computer-readable storage media of claim 16 where at least one of the additional trajectories relates to the second agent pulling over.

* * * * *